US 8,227,126 B2

(12) United States Patent
Tsunoda

(10) Patent No.: US 8,227,126 B2
(45) Date of Patent: Jul. 24, 2012

(54) FUEL CELL SYSTEM

(75) Inventor: Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 693 days.

(21) Appl. No.: 12/297,196

(22) PCT Filed: Apr. 11, 2007

(86) PCT No.: PCT/JP2007/058390
§ 371 (c)(1),
(2), (4) Date: Oct. 14, 2008

(87) PCT Pub. No.: WO2007/119864
PCT Pub. Date: Oct. 25, 2007

(65) Prior Publication Data
US 2009/0148733 A1 Jun. 11, 2009

(30) Foreign Application Priority Data

Apr. 14, 2006 (JP) ................................. 2006-112039

(51) Int. Cl.
*H01M 8/04* (2006.01)
(52) U.S. Cl. ...................................................... 429/441
(58) Field of Classification Search .................... 429/20, 429/17, 21, 30, 33–34, 23, 19, 26, 405–409, 429/411, 420, 423, 434, 441
See application file for complete search history.

(56) References Cited

U.S. PATENT DOCUMENTS

| 5,543,238 A * | 8/1996 | Strasser ........................ 429/409 |
| 7,273,357 B2 * | 9/2007 | Hattori et al. ................. 417/313 |
| 2002/0131921 A1 | 9/2002 | Ishikawa |
| 2004/0146763 A1 | 7/2004 | Pondo et al. |
| 2006/0147323 A1 * | 7/2006 | Stute et al. .................... 417/405 |

FOREIGN PATENT DOCUMENTS

| DE | 19606665 A1 | 8/1997 |
| DE | 19852853 A1 | 7/1999 |
| JP | 5-343083 | 12/1993 |
| JP | 2004-146343 | 5/2004 |
| JP | 2005-209621 | 8/2005 |
| JP | 2005-216620 | 8/2005 |
| WO | WO-01/95409 A2 | 12/2001 |

OTHER PUBLICATIONS

International Search Report for Application No. PCT/JP2007/058390, dated Oct. 25, 2007.
Japanese Office Action for Application No. 2006-112039, dated Nov. 15, 2011.

* cited by examiner

*Primary Examiner* — Jean F Duverne
(74) *Attorney, Agent, or Firm* — Nelson Mullins Riley & Scarborough LLP; Anthony A. Laurentano

(57) ABSTRACT

A fuel cell system includes a fuel cell stack, a heat exchanger for heating an oxygen-containing gas using a heat medium before the oxygen-containing gas is supplied to the fuel cell stack, a reformer for reforming a raw fuel chiefly containing hydrocarbon to produce a fuel gas to be supplied to the fuel cell stack, a combustor for burning a raw fuel and an exhaust gas discharged from the fuel cell stack after consumption in power generation reaction to produce a combustion gas as the heat medium, a casing containing the fuel cell stack, the heat exchanger, the reformer, and the combustor. A combustion gas outlet of the combustor is directly opened to a combustion gas inlet of the fluid unit.

9 Claims, 5 Drawing Sheets

→ EXHAUST GAS
→ AIR (OXYGEN-CONTAINING GAS)
→ FUEL GAS

---> EXHAUST GAS
---> AIR (OXYGEN-CONTAINING GAS)
---> FUEL GAS

--→ EXHAUST GAS
—→ AIR (OXYGEN-CONTAINING GAS)
—·→ FUEL GAS

FUEL CELL SYSTEM

RELATED APPLICATIONS

This application is a 35 U.S.C. 371 national stage filing of International Application No. PCT/JP2007/058390, filed 11 Apr. 2007, which claims priority to Japanese Patent Application No. 2006-112039 filed on 14 Apr. 2006 in Japan. The contents of the aforementioned applications are hereby incorporated by reference.

TECHNICAL FIELD

The present invention relates to a fuel cell system including a fuel cell stack formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, predetermined numbers of the electrolyte electrode assemblies and the separators are stacked together to form a fuel cell stack.

The operating temperature of the fuel cell is high, about 800° C. Therefore, at the time of starting operation of the fuel cell stack, it is desirable to heat the fuel cell stack to a desired temperature rapidly using a combustor. Normally, the combustor is provided on a side of the fuel cell stack where the oxygen-containing gas is supplied, or on a side of the fuel cell stack where the exhaust gas is discharged.

However, in the structure where the combustor is provided on the side where the oxygen-containing gas is supplied, the hot fuel gas produced by combustion in the combustor directly flows into the fuel cell stack. Therefore, the separators tend to be corroded easily by the hot combustion gas, and carbon in the combustion gas adheres to the separators.

In an attempt to address the problems, structure of providing the combustor on the side of the fuel cell stack where the exhaust gas is discharged may be adopted. For example, Japanese Laid-Open Patent Publication No. 5-343083 discloses a fuel cell power generation apparatus as shown in FIG. 5. The fuel cell power generation apparatus includes a reformer 1 for reforming a fuel gas to produce an anode gas containing hydrogen, a fuel cell 2 for performing power generation using the anode gas and a cathode gas containing oxygen, a catalyst combustor 3 for burning an anode exhaust gas discharged from the fuel cell 2, and a heat exchanger 4 for performing heat exchange between the anode gas having a high temperature from the reformer 1 and the fuel gas having a low temperature to be supplied to the reformer 1. All of the reformer 1, the fuel cell 2, the catalyst combustor 3, and the heat exchanger 4 are disposed in a single pressure container 5.

In the fuel cell power generation apparatus, the reformer 1 and the fuel cell 2 are connected by an anode gas line 6a such that the heat exchanger 4 is interposed between the reformer 1 and the fuel cell 2. The heat exchanger 4 and the reformer 1 are connected by a fuel gas line 6b. Further, the catalyst combustor 3 is connected to an exhaust gas outlet of the fuel cell 2 through an anode exhaust gas line 6c and a cathode exhaust gas line 6d. The reformer 1 is connected to an outlet of the catalyst combustor 3 through a combustion gas line 6e.

Thus, a relatively large space is required for the layout of the reformer 1, the fuel cell 2, the catalyst combustor 3, and the heat exchanger 4 in the pressure container 5. As a result, the overall size of the pressure container 5 becomes large. In the presence of a large number of pipes, heat efficiency is lowered.

DISCLOSURE OF INVENTION

The present invention solves the above problems, and an object of the present invention is to provide a fuel cell system including a casing having simple and compact structure in which heat efficiency is improved effectively.

The present invention relates to a fuel cell system comprising a fuel cell stack, a heat exchanger, a reformer, a combustor, and a casing. The fuel cell stack is formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode. The heat exchanger heats an oxygen-containing gas using a heat medium before the oxygen-containing gas is supplied to the fuel cell stack. The reformer reforms a raw fuel chiefly containing hydrocarbon to produce a fuel gas to be supplied to the fuel cell stack. The combustor burns the raw fuel and an exhaust gas discharged from the fuel cell stack after consumption in power generation reaction to produce a combustion gas as the heat medium. The casing contains the fuel cell stack, the heat exchanger, the reformer, and the combustor.

In the casing, the fluid unit at least including the heat exchanger and the reformer is disposed at one end of the fuel cell stack, and a combustion gas outlet of the combustor is directly opened to a combustion gas inlet of the fluid unit.

After the fuel gas is supplied to the anode for power generation reaction, when the fuel gas is discharged from the anode as an exhaust gas, the exhaust gas contains the unconsumed gas. The exhaust gas containing the unconsumed gas is referred to as the off gas.

According to the present invention, the fluid unit is provided at one end of the fuel cell stack, and the combustion gas outlet of the combustor is directly opened to the combustion gas inlet of the fluid unit. In the structure, the lengths of pipes in the casing are reduced as much as possible. Therefore, the casing has simple and compact structure as a whole.

Further, the combustion gas discharged from the combustor is directly supplied to the fluid unit. Therefore, it is possible to utilize the heat of the combustion gas efficiently, and heat the fuel cell stack and the fluid unit using the radiation heat effectively. Thus, improvement in heat efficiency is achieved.

BEST MODE FOR CARRYING OUT THE INVENTION

Figure 1:
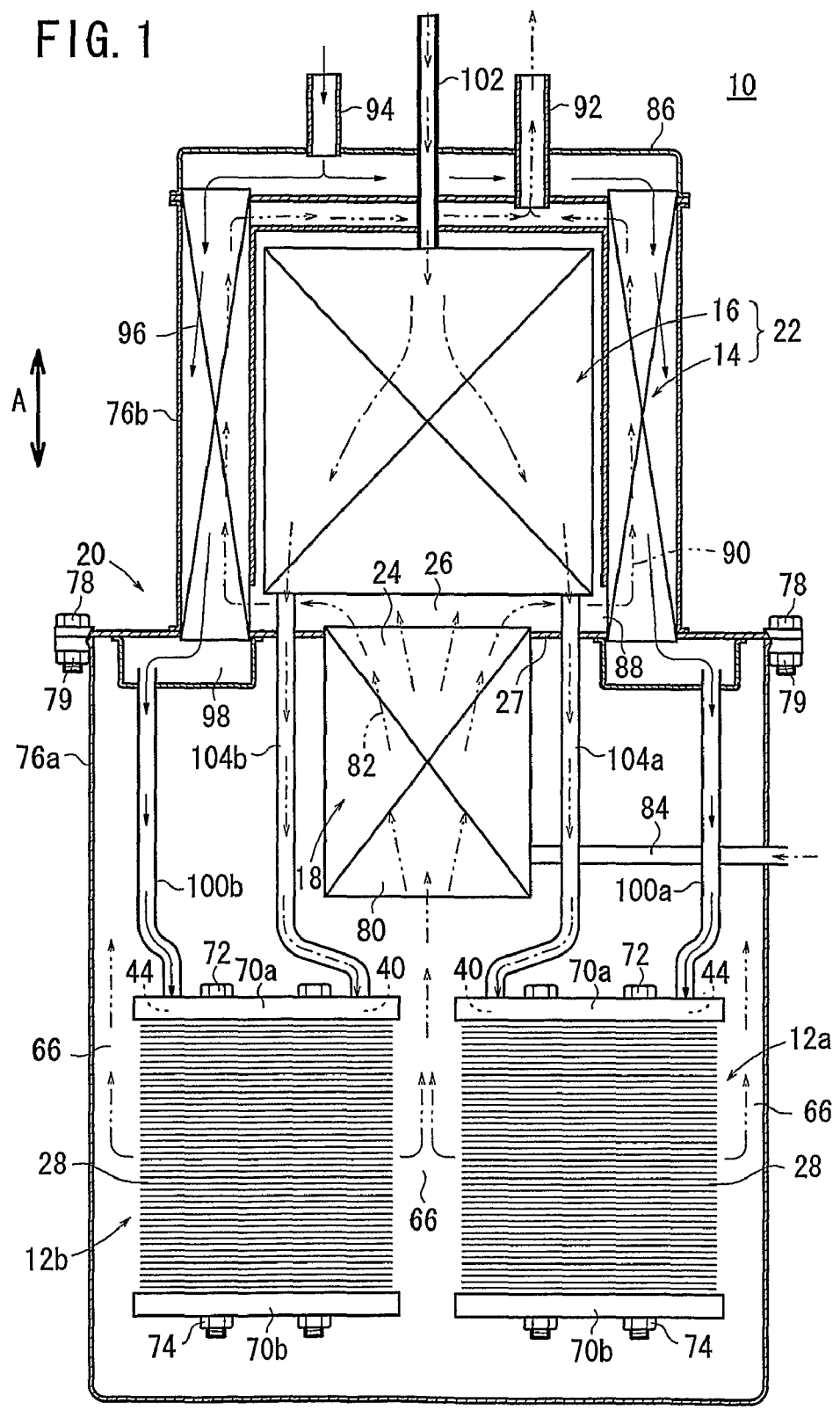
FIG. 1 is a partial cross sectional view showing a fuel cell system according to a first embodiment of the present invention.

FIG. 1 is a partial cross sectional view showing a fuel cell system 10 according to a first embodiment of the present invention.

The fuel cell system 10 is used in various applications, including stationary and mobile applications. For example, the fuel cell system 10 is mounted on a vehicle. The fuel cell system 10 includes a pair of fuel cell stacks 12a, 12b, a heat exchanger 14, a reformer 16, a combustor 18, and a casing 20. The heat exchanger 14 heats an oxygen-containing gas before it is supplied to the fuel cell stacks 12a, 12b. The reformer 16 reforms a raw fuel chiefly containing hydrocarbon to produce a fuel gas. The combustor 18 burns the raw fuel and an exhaust gas to produce a combustion gas. The exhaust gas is discharged from the fuel cell stacks 12a, 12b after consumption in the power generation. The fuel cell stacks 12a, 12b, the heat exchanger 14, the reformer 16, and the combustor 18 are disposed in the casing 20.

In the casing 20, a fluid unit 22 including at least the heat exchanger 14 and the reformer 16 is disposed on one side of the fuel cell stacks 12a, 12b. A combustion gas outlet 24 of the combustor 18 is directly opened to a combustion gas inlet 26 of the fluid unit 22. The combustion gas outlet 24 and the combustion gas inlet 26 are shielded by a partition plate 27 from the fuel cell stacks 12a, 12b.

Figure 2:
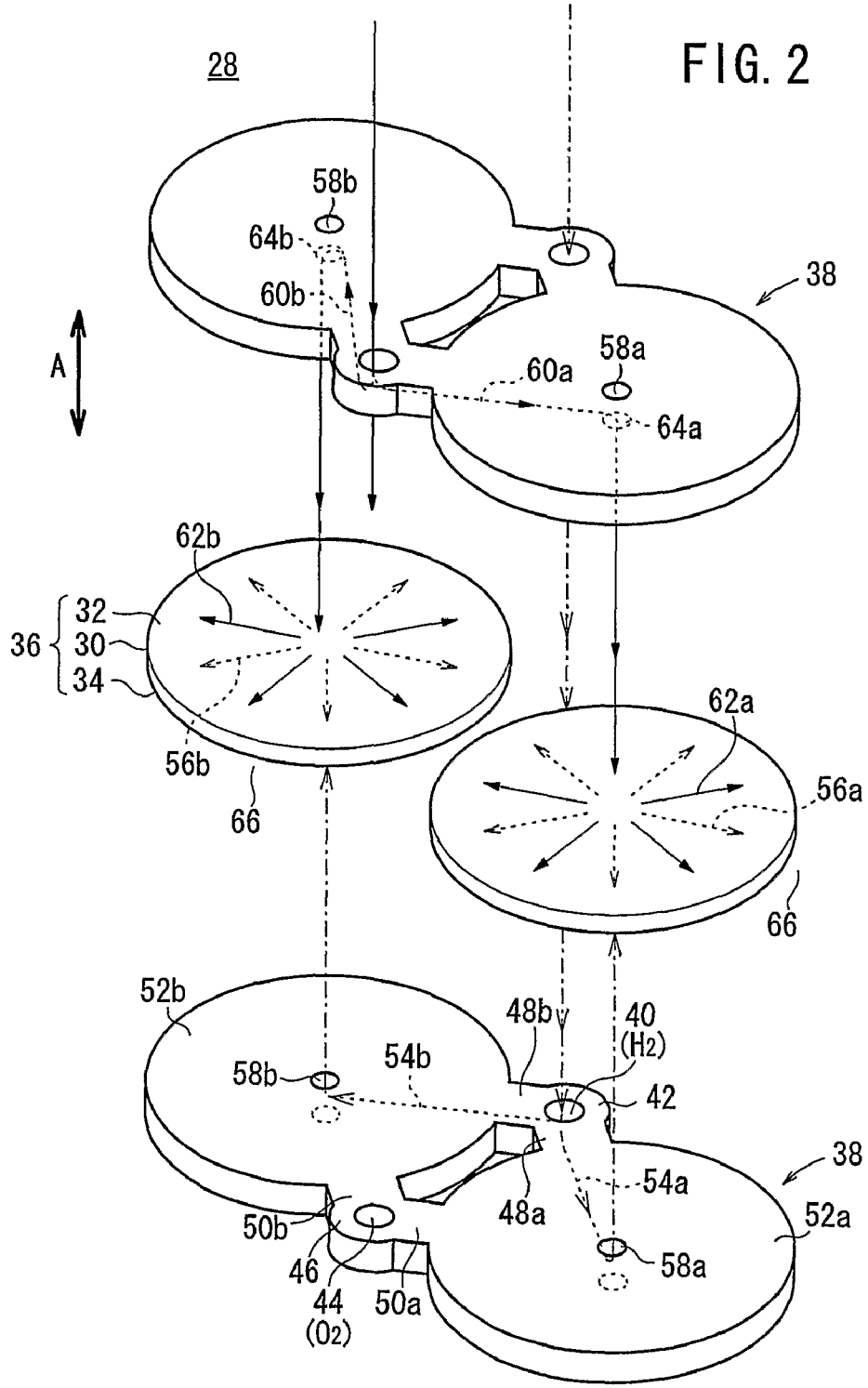
FIG. 2 is an exploded perspective view showing a fuel cell stack of the fuel cell system.

The fuel cell stacks 12a, 12b have the same structure. The fuel cell stacks 12a, 12b are formed by stacking a plurality of fuel cells 28 in a direction indicated by an arrow A. The fuel cell 28 is a solid oxide fuel cell (SOFC). As shown in FIG. 2, the fuel cell 28 includes electrolyte electrode assemblies 36 each having a circular disk shape. Each of the electrolyte electrode assemblies 36 includes a cathode 32, an anode 34, and an electrolyte (electrolyte plate) 30 interposed between the cathode 32 and the anode 34. For example, the electrolyte 30 is made of ion-conductive solid oxide such as stabilized zirconia.

The fuel cell 28 is formed by stacking two electrolyte electrode assemblies 36 between a pair of separators 38. The separator 38 has a first small diameter end portion 42 and a second small diameter end portion 46. A fuel gas supply passage 40 for supplying the fuel gas extends through the first small diameter end portion 42, and an oxygen-containing gas supply passage 44 for supplying the oxygen-containing gas extends through the second small diameter end portion 46, respectively, in the stacking direction indicated by the arrow A.

The first small diameter end portion 42 and the second small diameter end portion 46 are integral with a first circular disk 52a having a relatively large diameter through narrow bridges 48a, 50a. Likewise, the first small diameter end portion 42 and the second small diameter end portion 46 are integral with a second circular disk 52b having a relatively large diameter through narrow bridges 48b, 50b. The first circular disk 52a, the second circular disk 52b, and the electrolyte electrode assembly 36 have substantially the same size.

Fuel gas supply channels 54a, 54b are formed in the bridges 48a, 48b. The fuel gas supply channels 54a, 54b are connected to the fuel gas supply passage 40, and extend into the first circular disk 52a and the second circular disk 52b. Fuel gas flow fields 56a, 56b are formed between the first circular disk 52a and the anode 34 of one of the electrolyte electrode assemblies 36, and between the second circular disk 52b and the anode 34 of the other electrolyte electrode assembly 36. The fuel gas flow fields 56a, 56b are connected to the fuel gas supply channels 54a, 54b through fuel gas inlets 58a, 58b formed at the center of the first circular disk 52a and the center of the second circular disk 52b.

Oxygen-containing gas supply channels 60a, 60b are formed in the bridges 50a, 50b. The oxygen-containing gas supply channels 60a, 60b are connected to the oxygen-containing gas supply passage 44, and extend into the first circular disk 52a and the second circular disk 52b. Oxygen-containing gas flow fields 62a, 62b are formed between the first circular disk 52a and the cathode 32 of one of the electrolyte electrode assemblies 36, and between the second circular disk 52b and the cathode 32 of the other electrolyte electrode assembly 36. The oxygen-containing gas flow fields 62a, 62b are connected to the oxygen-containing gas supply channels 60a, 60b through oxygen-containing gas inlets 64a, 64b formed at the center of the first circular disk 52a and the center of the second circular disk 52b.

The fuel gas and the oxygen-containing gas flow through the fuel gas flow fields 56a, 56b, and the oxygen-containing gas flow fields 62a, 62b outwardly from the centers of the electrolyte electrode assemblies 36. An exhaust gas channel 66 is formed around the electrolyte electrode assemblies 36. The consumed fuel gas and the consumed oxygen-containing gas are discharged as an exhaust gas through the exhaust gas channel 66. The consumed fuel gas (off gas) contains unburned fuel gas.

As shown in FIG. 1, each of the fuel cell stacks 12a, 12b includes end plates 70a, 70b provided at opposite ends of the fuel cells 28 in the stacking direction. Components between the end plates 70a, 70b are tightened together by a plurality of bolts 72 and nuts 74 in the stacking direction.

The casing 20 includes a first case unit 76a containing the fuel cell stacks 12a, 12b and the combustor 18, and a second case unit 76b containing the fluid unit 22. The joint portion between the first case unit 76a and the second case unit 76b is tightened by bolts 78 and nuts 79.

The combustor 18 is provided near the fuel cell stacks 12a, 12b in the first case unit 76a. The combustor 18 has an exhaust gas inlet 80. The exhaust gas discharged to the exhaust gas channel 66 of the fuel cell stacks 12a, 12b flows into the exhaust gas inlet 80 of the combustor 18. A combustion channel 82 connected from the exhaust gas inlet 80 to the combustion gas outlet 24 is provided in the combustor 18. A raw fuel supply pipe 84 for supplying the raw fuel from the outside is connected to the combustion channel 82.

A head plate 86 is fixed to the second case unit 76b. The fluid unit 22 is provided in the second case unit 76b symmetrically with respect to the central axis of the fuel cell stacks 12a, 12b. Specifically, the substantially cylindrical reformer 16 is provided inside the substantially ring shaped heat exchanger 14.

The heat exchanger 14 has an opening 88 connected to the combustion gas inlet 26. The combustion gas inlet 26 is connected to a channel 90 in the heat exchanger 14 through the opening 88. The channel 90 is connected to an exhaust gas pipe 92 connected to the head plate 86. The head plate 86 is connected to an air supply pipe 94. The air supply pipe 94 is connected to a chamber 98 through a channel 96 in the heat exchanger 14.

A pair of air pipes 100a, 100b are connected to the chamber 98 at one end, and connected to the oxygen-containing gas supply passage 44 of the fuel cell stacks 12a, 12b at the other end. The reformer 16 has a fuel gas supply pipe 102 and a pair of reforming gas supply pipes 104a, 104b. The fuel gas supply pipe 102 extends to the outside through the head plate 86, and the reforming gas supply pipes 104a, 104b are connected to the fuel gas supply passages 40 through the end plates 70a.

Next, operation of the fuel cell system 10 will be described below.

Firstly, as shown in FIG. 1, a raw fuel (methane, ethane, propane, or the like) and, as necessary, water are supplied from the fuel gas supply pipe 102, and an oxygen-containing gas (hereinafter also referred to as the "air") is supplied from the air supply pipe 94.

The raw fuel is reformed when it passes through the reformer 16 to produce a fuel gas (hydrogen-containing gas). The fuel gas is supplied to the fuel gas supply passage 40 of the fuel cell stacks 12a, 12b through the reforming gas supply pipes 104a, 104b. The fuel gas moves in the stacking direction indicated by the arrow A, and flows into the fuel gas supply channels 54a, 54b formed in the separator 38 of each fuel cell 28 (see FIG. 2).

The fuel gas flows along the fuel gas supply channels 54a, 54b between the bridges 48a, 48b, and flows through the fuel gas inlets 58a, 58b of the first and second circular disks 52a, 52b into the fuel gas flow fields 56a, 56b. The fuel gas inlets 58a, 58b are formed at positions corresponding to substantially the central positions of the anodes 34 of the electrolyte electrode assemblies 36. Thus, the fuel gas is supplied from the fuel gas inlets 58a, 58b to substantially the central regions of the anodes 34, and flows outwardly from the central regions of the anodes 34 along the fuel gas flow fields 56a, 56b.

As shown in FIG. 1, the air flows from the air supply pipe 94 through the channel 96 of the heat exchanger 14, and the air is temporality supplied into the chamber 98. Then, the air flows through the air pipes 100a, 100b connected to the chamber 98, and the air is supplied into the oxygen-containing gas supply passage 44 of each fuel cell 28.

In the heat exchanger 14, as described later, the exhaust gas discharged into the exhaust gas channel 66 is heated by the combustor 18, and supplied to the channel 90 as a combustion gas. In the structure, heat exchange between the combustion gas and the air before consumption is performed, and the air is reliably heated to a desired operating temperature of the fuel cells beforehand.

As shown in FIG. 2, the air supplied to the oxygen-containing gas supply passage 44 flows along the oxygen-containing gas supply channels 60a, 60b formed between the bridges 50a, 50b, and the oxygen-containing gas flows through the oxygen-containing gas inlets 64a, 64b of the first circular disk 52a and the second circular disk 52b into the oxygen-containing gas flow fields 62a, 62b.

The oxygen-containing gas inlets 64a, 64b are formed at positions corresponding to substantially the central positions of the cathodes 32 of the electrolyte electrode assemblies 36. In the structure, the oxygen-containing gas flows outwardly from the central regions of the cathodes 32 along the oxygen-containing gas flow fields 62a, 62b.

Thus, in the electrolyte electrode assembly 36, the fuel gas flows from the central region to the outer circumferential region of the anode 34, and the oxygen-containing gas flows from the central region to the outer circumferential region of the cathode 32. At this time, oxygen ions flow through the electrolyte 30 toward the anode 34 for generating electricity by electrochemical reactions.

The fuel gas after consumption in the fuel gas flow fields 56a, 56b and the air after consumption in the oxygen-containing gas flow fields 62a, 62b are discharged from the outer circumferential regions of the electrolyte electrode assemblies 36 to the exhaust gas channel 66. The gases are mixed in the exhaust gas channel 66, and discharged as the exhaust gas.

In the first embodiment, the fuel cell stacks 12a, 12b, and the fluid unit 22 are disposed in the casing 20, and the combustor 18 is interposed between the fuel cell stacks 12a, 12b and the fluid unit 22. The combustion gas outlet 24 of the combustor 18 is directly opened to the combustion gas inlet 26 of the fluid unit 22. In the structure, no line is required for connecting the combustor 18 and the fluid unit 22 including the heat exchanger 14 and the reformer 16.

Thus, the fuel cell stacks 12a, 12b, the combustor 18, and the fluid unit 22 can be positioned adjacent to one another. The overall size of the casing 20 can be reduced, and the entire structure of the casing 20 is simplified advantageously.

Further, the combustion gas discharged from the combustor 18 directly flows into the combustion gas inlet 26, and partially flows through the opening 88 into the channel 90 of the heat exchanger 14. The rest of the combustion gas discharged from the combustor 18 is used as a heat source for heating the reformer 16. Thus, the heat of the combustion gas discharged from the combustor 18 is utilized efficiently, and the fuel cell stacks 12a, 12b, and the fluid unit 22 can be heated effectively by radiation heat from the combustor 18. Thus, improvement in heat efficiency is achieved. It is possible to rapidly raise the temperature of the SOFC to the temperature range for power generation, and start power generation operation of the SOFC.

Further, since all of the exhaust gas necessarily flows through the combustor 18, the unburned fuel gas is burned in the combustor 18 reliably. Thus, the combustion gas discharged from the combustor 18 is purified, and heat generated in the combustion of the unburned fuel gas is utilized for heating the fuel cell stacks 12a, 12b and the fluid unit 22.

Figure 3:
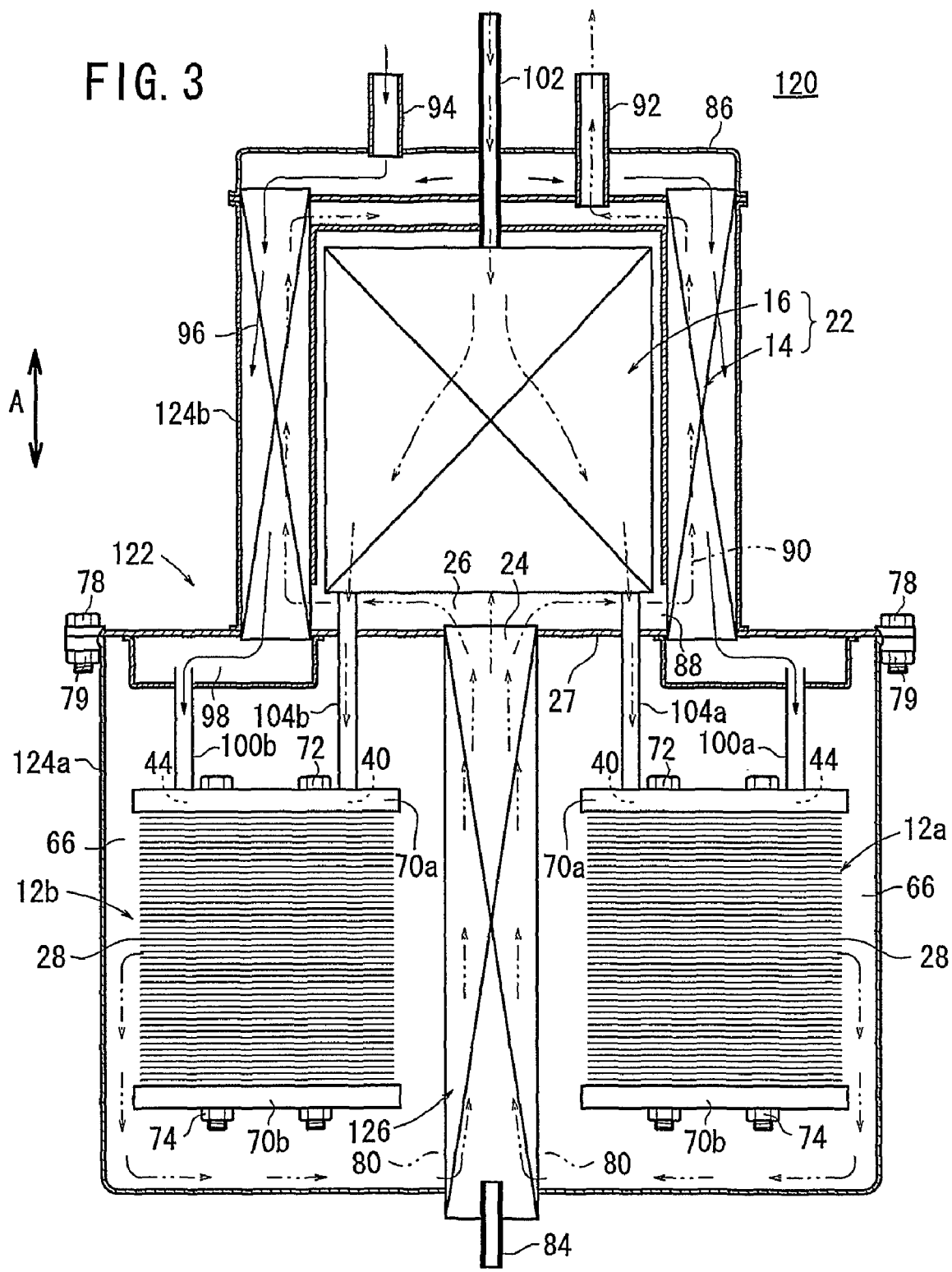
FIG. 3 is a partial cross sectional view showing a fuel cell system according to a second embodiment.

FIG. 3 is a partial cross sectional view showing a fuel cell system 120 according to a second embodiment of the present invention. The constituent elements of the fuel cell system 120 that are identical to those of the fuel cell system 10 according to the first embodiment are labeled using the same reference numerals, and descriptions thereof have been omitted. Further, in a third embodiment as described later, the constituent elements that are identical to those of the fuel cell system 10 according to the first embodiment is labeled using the same reference numerals, and descriptions thereof will be omitted.

The fuel cell system 120 has a casing 122. The casing 122 includes a first case unit 124a containing the fuel cell stacks 12a, 12b and a second case unit 124b containing the fluid unit 22.

An elongated combustor 126 extending in the direction indicated by an arrow A between the fuel cell stacks 12a, 12b is provided in the first case unit 124a. A combustion gas outlet 24 provided at one end of the combustor 126 is directly opened to a combustion gas inlet 26 of the fluid unit 22. The other end of the combustor 126 extends outwardly from the first case unit 124a. An exhaust gas inlet 80 connected to the exhaust gas channel 66 in the first case unit 124a is provided near the other end of the combustor 126.

In the second embodiment, the fuel cell stacks 12a, 12b, and the fluid unit 22 can be positioned adjacent to one another. The overall dimension of the fuel cell system 120 in the direction indicated by the arrow A is reduced significantly.

The combustor 126 is positioned between the fuel cell stacks 12a, 12b, and extends in the direction indicated by the arrow A. Thus, by radiation heat from the combustor 126, the fuel cell stacks 12a, 12b are heated suitably, and improvement in heat efficiency is achieved advantageously.

Further, also in the second embodiment, all of the exhaust gas discharged from the fuel cell stacks 12a, 12b necessarily flows through the combustor 126. In the same manner as in the case of the first embodiment, the combustion gas discharged from the combustor 126 is purified, and the heat generated in combustion of the unburned fuel gas can be utilized for heating the fuel cell stacks 12a, 12b, and the fluid unit 22.

Figure 4:
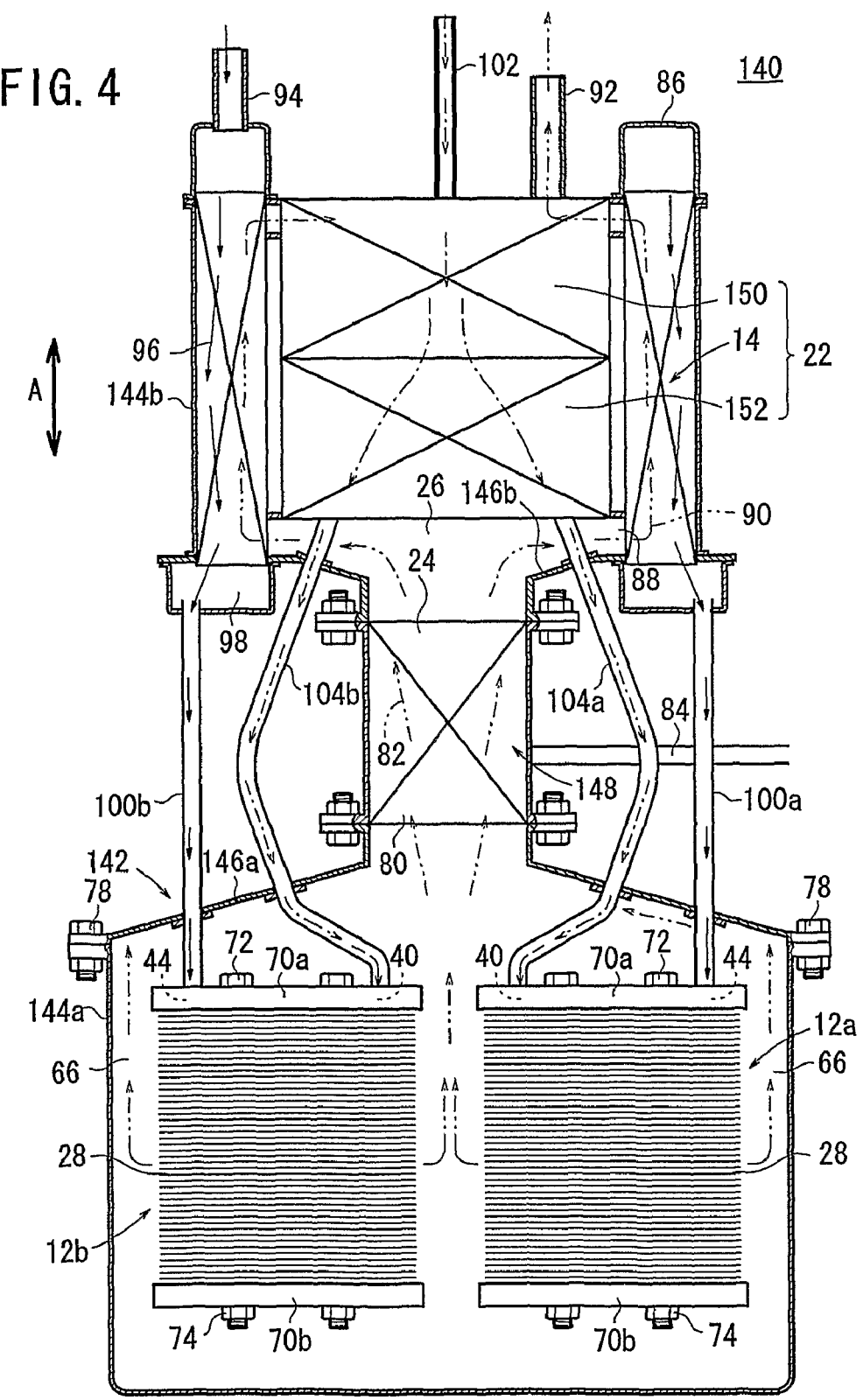
FIG. 4 is a partial cross sectional view showing a fuel cell system according to a third embodiment.
Figure 5:
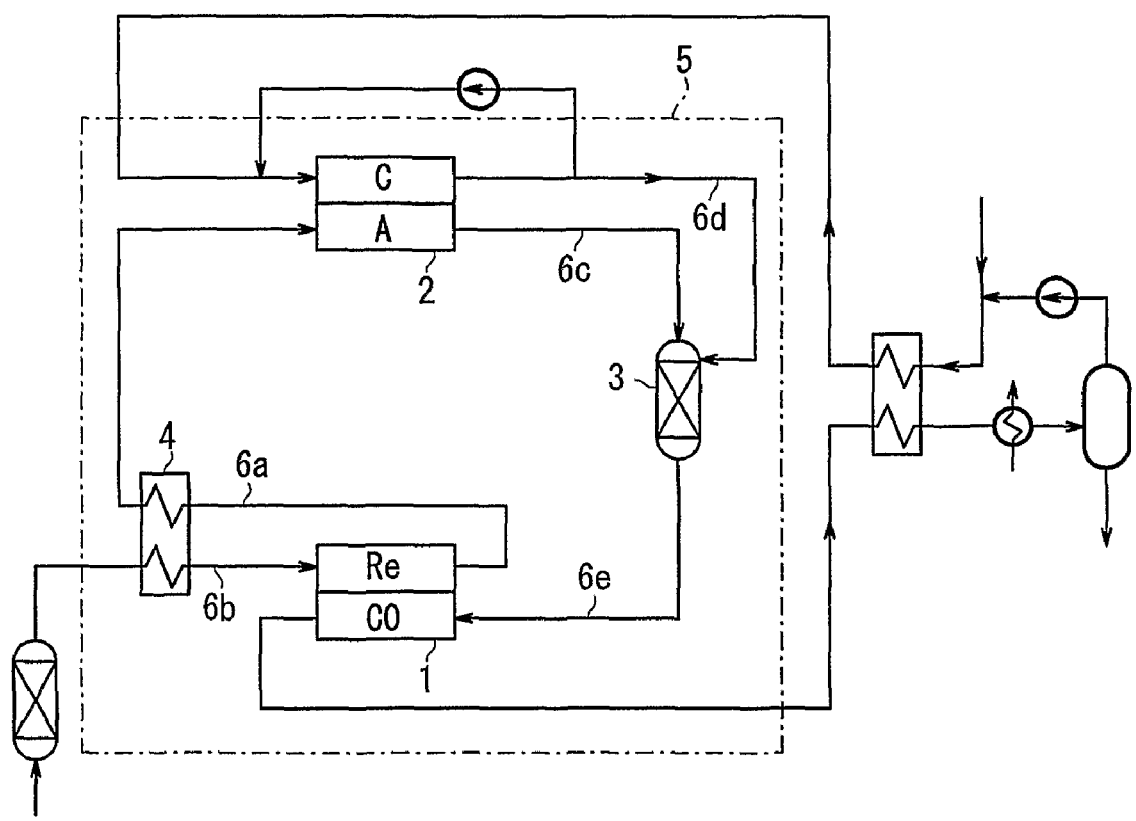
FIG. 5 is a diagram schematically showing a conventional fuel cell power generation apparatus.

FIG. 4 is a partial cross sectional view showing a fuel cell system 140 according to the third embodiment of the present invention.

The fuel cell system 140 has a casing 142. The casing 142 includes a first case unit 144a containing the fuel cell stacks 12a, 12b and a second case unit 144b containing the fluid unit 22. A combustor 148 is provided between the first case unit 144a and the second case unit 144b through connection casing units 146a, 146b.

An evaporator 150 for evaporating water and a reformer (preliminary reformer) 152 using the water vapor (steam) and a raw fuel (e.g., city gas) for steam reforming of the raw fuel are provided adjacent to each other at the center of the second case unit 144b.

In the third embodiment, the fuel cell stacks 12a, 12b are connected to the fluid unit 22 through the combustor 148 provided between the fuel cell stacks 12a, 12b and the fluid unit 22. In the structure, the same advantages as in the case of the first and second embodiments can be achieved. For example, radiation heat from the combustor 148 is utilized for heating the fuel cell stacks 12a, 12b and the fluid unit 22. Further, since the evaporator 150 and the reformer 152 each having a high temperature are provided adjacent to each other, improvement in the heat conservation performance is achieved, and heat efficiency is improved advantageously.

The invention claimed is:

1. A fuel cell system comprising:
   a fuel cell stack formed by stacking a plurality of fuel cells, said fuel cells each being formed by stacking an electrolyte electrode assembly and a separator, said electrolyte electrode assembly including an anode, a cathode, and an electrolyte interposed between said anode and said cathode;
   a heat exchanger for heating an oxygen-containing gas using a heat medium before the oxygen-containing gas is supplied to said fuel cell stack;
   a reformer for reforming a raw fuel chiefly containing hydrocarbon to produce a fuel gas to be supplied to said fuel cell stack;
   a combustor for burning the raw fuel and an exhaust gas discharged from said fuel cell stack after consumption in power generation reaction to produce a combustion gas as the heat medium; and
   a casing containing said fuel cell stack, said heat exchanger, said reformer, and said combustor, wherein
   a fluid unit at least including said heat exchanger and said reformer is disposed only at one end of said fuel cell stack in said casing; and
   a combustion gas outlet of said combustor is directly opened to a combustion gas inlet of said fluid unit.

2. A fuel cell system according to claim 1, wherein said casing includes a first case unit containing said fuel cell stack and a second case unit containing said fluid unit; and
   said combustion gas outlet of said combustor is directly opened to the inside of said second case unit.

3. A fuel cell system according to claim 2, wherein all the exhaust gas discharged from said fuel cell stack flows through said combustor, and then, flows into said second case unit as the combustion gas.

4. A fuel cell system according to claim 2, wherein said combustor extends through said fuel cell stack.

5. A fuel cell system according to claim 2, wherein said combustor connects said first case unit and said second case unit.

6. A fuel cell system according to claim 1, wherein said fluid unit includes an evaporator for evaporating water to produce a mixed fluid containing the raw fuel and water vapor.

7. A fuel cell system according to claim 6, wherein said reformer is provided inside said heat exchanger, near said fuel cell stack; and
   said reformer and said evaporator are provided adjacent to each other.

8. A fuel cell system according to claim 1, wherein the combustion gas discharged from said combustor is used for heat exchange at said heat exchanger), and thereafter, supplied to said reformer as a heat source for reforming the raw fuel.

9. A fuel cell system according to claim 8, wherein part of the combustion gas discharged from said combustor is supplied to said reformer, without passing through said heat exchanger, as a heat source for reforming the raw fuel.

* * * * *